No. 845,330.  
PATENTED FEB. 26, 1907.  
H. C. BOWMAN.  
FRUIT BIN.  
APPLICATION FILED JAN. 17, 1906.
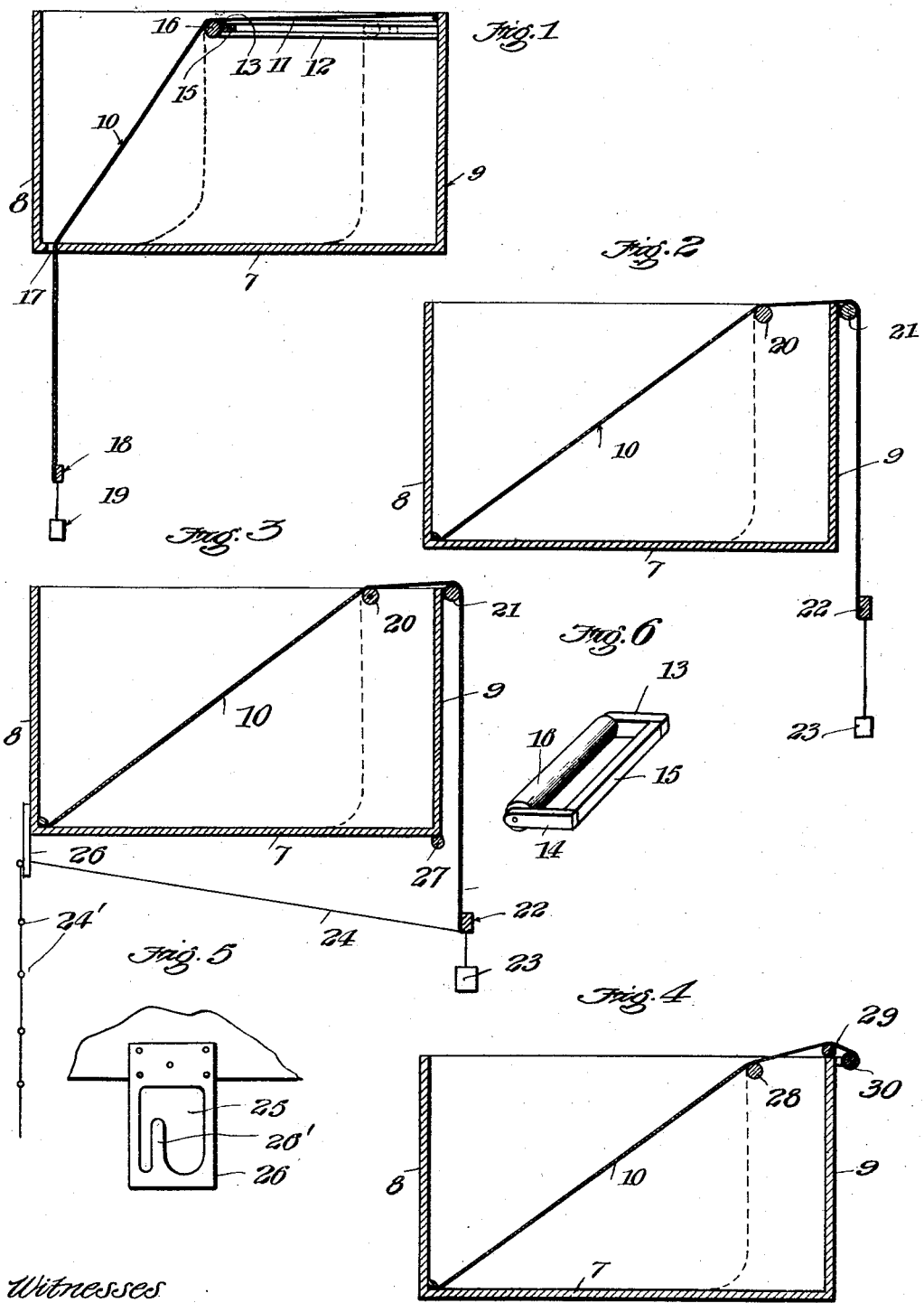

UNITED STATES PATENT OFFICE.

HOMER C. BOWMAN, OF LOS ANGELES, CALIFORNIA, ASSIGNOR TO FRED STEBLER AND AUSTIN A. GAMBLE, BOTH OF RIVERSIDE, CALIFORNIA.

FRUIT-BIN.

No. 845,330.　　　　Specification of Letters Patent.　　　　Patented Feb. 26, 1907.

Application filed January 17, 1906. Serial No. 296,568.

*To all whom it may concern:*

Be it known that I, HOMER C. BOWMAN, a citizen of the United States, residing at Los Angeles, county of Los Angeles, and State of California, have invented new and useful Improvements in Fruit-Bins, of which the following is a specification.

My invention relates to improvements in fruit-bins from which fruit is packed; and the objects thereof are to provide means to prevent the fruit from being bruised as it passes into the bin from the grader and to keep the fruit at the front of the bin, so as to be within easy reach of the packer. I accomplish these objects by the mechanism described herein and illustrated in the accompanying drawings, in which—

Figure 1 is a vertical longitudinal section of my improved fruit-bin. Figs. 2, 3, and 4 show modifications of means for holding the false bottom yieldingly supported above the true bottom. Fig. 5 illustrates a detail of construction shown in Fig. 3. Fig. 6 is a detail of construction shown in Fig. 1.

In the drawings, 7 is the true bottom of the bin, and 8 is the front end, and 9 the rear end, of the bin. In Fig. 1 I have shown the false bottom 10 secured to the rear end of the bin at the top thereof. A guideway composed of slats 11 and 12 (shown in Fig. 1) is secured to each side of the bin and extends, preferably, from the rear end thereof toward the front to a little beyond the middle and is placed close to the top of the bin. A sliding frame composed of end pieces 13 and 14, united by a cross-bar 15, has mounted therein a roller 16. This sliding frame is mounted in the guideway formed by the slats, and the false bottom passes over the same and downwardly through a slot 17 at the front of and in the true bottom. The free end of the false bottom is preferably secured to a cross-bar 18, to which a weight 19 is connected to keep the false bottom reasonably taut.

In the practical use of my bin of the form shown in Fig. 1 the fruit is received from the grading-machine upon the false bottom near the back of the bin and rolls down the false bottom to the front of the bin. As the front of the bin fills with fruit the false bottom will be pressed downwardly and backwardly and will assume the position shown in the dotted lines at the front of the bin, and the sliding frame will be gradually pushed backward toward the back of the bin until the bin is filled, thereby always keeping the front of the bin filled.

In Figs. 2 and 3 I have shown the false bottom secured to the true bottom at the front thereof and passing over a roller 20, revolubly mounted in the sides of the bin, and thence over a roller 21, revolubly mounted in bearings secured to the back of the bin, and passing downwardly to a bar 22, to which is secured a weight 23 to hold the false bottom reasonably and yieldingly taut. In this construction the weight of the fruit as the bin is being filled will gradually cause the false bottom to be borne down upon the true bottom and forced backward until it assumes the position shown by dotted lines at the rear of the bin. In Fig. 3 I have shown a rope 24, which passes through an aperture 25 in a holding-board 26, which board is secured to the front of the bin, as shown in Fig. 3. The aperture through this holding-board is divided by a tongue 26' into a wide and narrow slot. The rope at the free end thereof is provided with knots 24', which will freely slip through the wide slot, but will not slip through the narrow slot. When the bin is being filled, the rope is thrown into the wide slot, and the weight on the end of the false bottom holds it yieldingly supported and permits the same to be borne down upon the true bottom and forced backwardly until the bin is filled. When packing the fruit out of the bin, the operator by means of rope 24 can pull the rear end of the false bottom upwardly, so as to throw the fruit to the front end of the bin and lock the bottom in that position by passing the rope into the narrow slot, thereby keeping the front of the bin conveniently filled with fruit until all is packed out. The rope is then thrown into the wide slot, when the bin is ready for refilling. To avoid friction, I have placed a roller 27 at the bottom and back of the bin. A rope may be used with the form shown in Figs. 2 and 3.

In Fig. 4 the false bottom is secured at the front of the bin and passes over a roller 28, revolubly mounted in the sides of the bin, over another roller 29, revolubly mounted in bearings secured to the bin, so that the roller will project above the top of the bin, and is then passed to a spring-roller 30 of the Hartshorn roller type, which is revolubly mounted in bearings secured to the rear end of the bin.

The fruit is received from the grader in all forms upon the false bottom at the rear end of the bin and in such close proximity to the grader that the fruit has little drop, and therefore is in no danger of being bruised, and the fruit runs to the front upon the false bottom, so that it is deposited in the bin without being bruised.

Having described my invention, what I claim is—

1. In a fruit-bin, a true bottom, a front wall for the bin, a flexible false bottom extending from approximately the joint of the front wall and true bottom diagonally toward the rear and top of the bin, one end of the false bottom being fixed and the other free, a support for the false bottom intermediate its end and above the true bottom, and means for normally and yieldingly holding the false bottom above the true bottom.

2. In a fruit-bin the combination of a true bottom; a false bottom above the true bottom, said false bottom being fixed at one end and having means at the other end for maintaining a tension thereon; and means intermediate its ends to retain said false bottom elevated above the true bottom.

3. In a fruit-bin the combination of a true bottom; a false bottom above the true bottom, said false bottom being fixed at one end and having means at the other end for maintaining a tension thereon; guides at the side of the bin; a sliding frame carried by said guides; and a rotating roller beneath the false bottom and carried by said sliding frame.

4. In a fruit-bin the combination of a false bottom fixed at one end; means secured to the other end for maintaining a tension upon the false bottom; and sliding means beneath said false bottom intermediate its ends for supporting the false bottom at an elevation above the true bottom as the bin is being filled, said supporting means being adapted to be moved backwardly by the weight of the fruit on the false bottom.

5. The combination in a fruit-bin of a soft flexible false bottom secured at one end and running from the front of the true bottom to the rear end of the bin at the top thereof; a supporting sliding frame beneath said false bottom intermediate its ends; means to support and guide said sliding frame above the true bottom; and means to keep said false bottom taut.

6. In a fruit-bin, a flexible false bottom fixed at one end and having its other end free and extending diagonally in the bin, a support for said false bottom intermediate its ends and above the true bottom of the bin, and means secured to the free end of the false bottom to yieldingly hold the false bottom above the true bottom.

In witness that I claim the foregoing I have hereunto subscribed my name this 11th day of January, 1906.

HOMER C. BOWMAN.

Witnesses:
G. E. HARPHAM,
HENRY T. HAZARD.